Dec. 25, 1951 L. HANSON 2,579,667
SUCTION VALVE FOR RECIPROCATING COMPRESSORS
Filed Sept. 10, 1946 2 SHEETS—SHEET 1
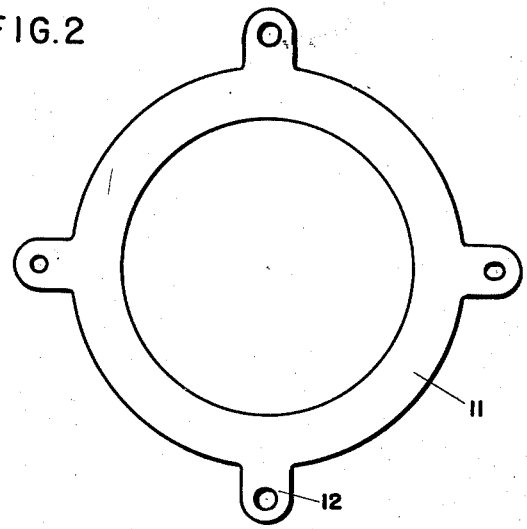
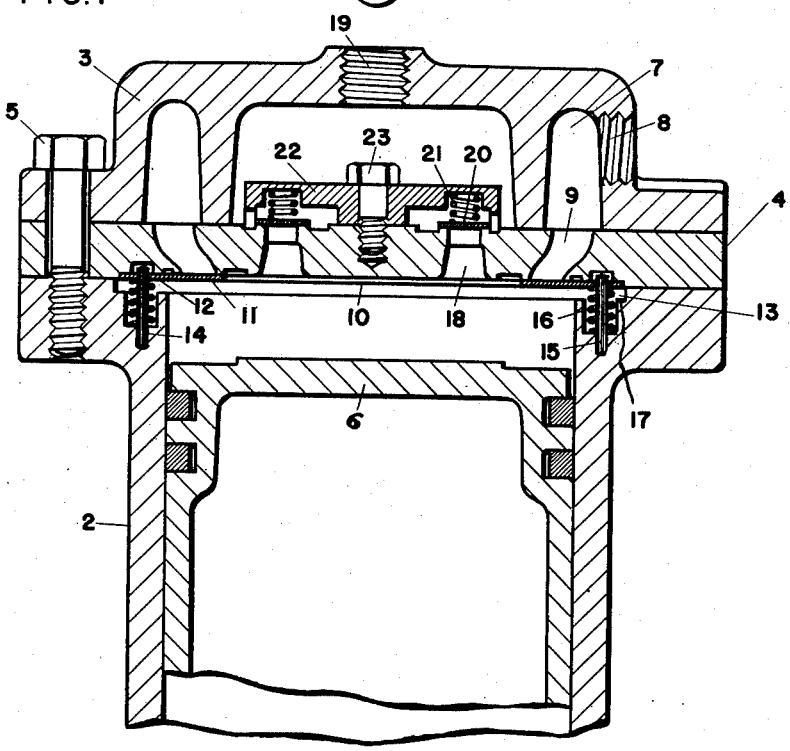
INVENTOR.
Lars Hanson
BY

Patented Dec. 25, 1951

2,579,667

UNITED STATES PATENT OFFICE 2,579,667

SUCTION VALVE FOR RECIPROCATING COMPRESSORS

Lars Hanson, Syracuse, N. Y., assignor to Carrier Corporation, Syracuse, N. Y., a corporation of Delaware Application September 10, 1946, Serial No. 695,976

6 Claims. (Cl. 251—119)

This invention relates to valves and more particularly to suction valves for fluid compressors such as reciprocating compressors used in refrigeration systems.

The chief object of this invention is to provide an improved valve for use in fluid compressors.

An object of the invention is to provide a valve mechanism which permits a reasonably high valve lift and low gas velocity.

A further object is to provide a valve mechanism which is economical and efficient in operation and in which mechanical noise is held to a minimum even at high speed.

A still further object is to provide a suction valve of enhanced efficiency in operation which is economical and simple in design. Other objects of my invention will be readily perceived from the following description.

The invention relates to valve mechanism and comprises in combination port means for the passage of fluid, a movable valve member adapted to close the port means, a plurality of spaced elements integral with the valve member and extending radially therefrom, and yieldable means engaging the spaced elements to secure the valve member in position to close the port means.

The attached drawings illustrate a preferred embodiment of my invention in which:

Figure 1 is a sectional view through a fluid compressor illustrating the valve mechanism of my invention;

Figure 2 is a plan view of the valve member; and

Figure 3:
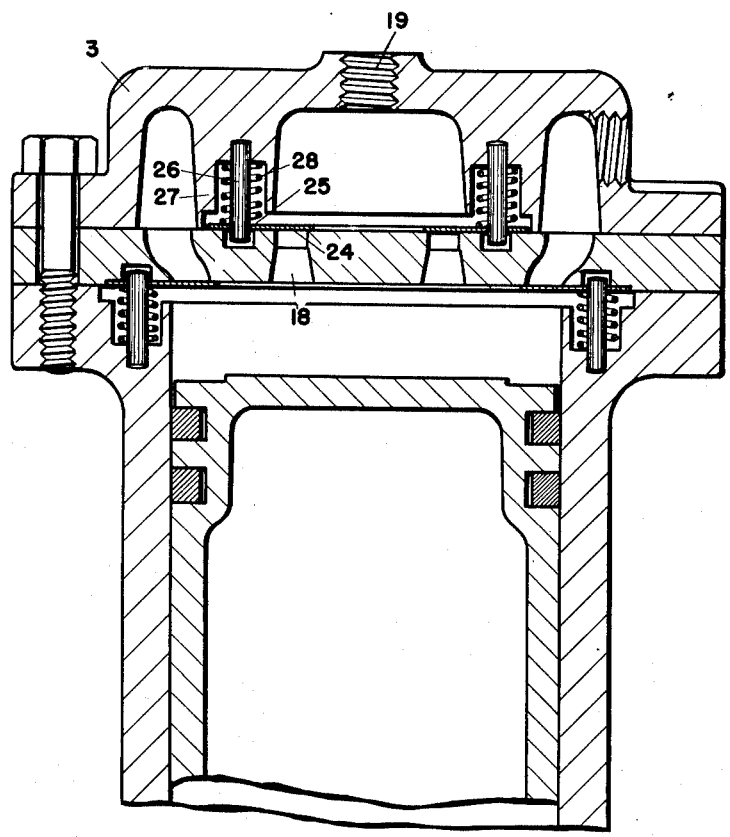
Figure 3 is a view similar to Figure 1 illustrating a modified form of discharge valve.

Referring to the drawings there is shown a fluid compressor comprising a cylinder 2, a cylinder head 3, and a valve plate 4 disposed between the cylinder and the cylinder head and secured in place by fastening means 5. A piston 6 is provided in cylinder 2.

Cylinder head 3 is provided with a channel 7 for the reception of gaseous fluid through inlet 8. Valve plate 4 is provided with ports 9 to permit the passage of gaseous fluid from channel 7 to the interior of cylinder 2 where it is compressed by piston 6. Ports 9 in valve plate 4 are closed by valve member 10.

Valve member 10 preferably is in the form of a ring 11 having a plurality of spaced lugs 12 extending radially therefrom. Valve member 10 is disposed between valve plate 4 and cylinder 2 to close the ports 9 in plate 4.

A plurality of milled indentations or recesses 13 may be formed in the wall of cylinder 2 adapted to receive the lugs 12 of valve member 10; if desired, a single recess may be formed extending about the wall of cylinder 2 in place of the indentations or recesses 13. Openings 14 are formed in such recesses 13 to receive guide pins 15; such pins fit in holes or orifices of the lugs to guide valve member 10 in its travel from and towards ports 9. Springs 16 are disposed in the openings in the wall of the cylinder and serve to yieldably urge valve member 10 against ports 9 to close the same. The wall of the cylinder forming the bases of recesses 13 functions as a stop 17 to limit the travel of valve member 10. That is, it limits the movement of lugs 12 which in turn limits the travel of ring 11.

Ports 18 are also provided in valve plate 4 to permit the discharge of compressed fluid from cylinder 2 into cylinder head 3 and its discharge from cylinder head 3 through outlet 19. Any suitable form of discharge valve may be employed. For example, as shown in Figure 1 a ring member 20 may be provided to close ports 18. Ring member 20 is held in position by means of springs 21 which in turn are disposed in guide member 22 which is secured to plate 4 by means of fastening means 23.

Considering the operation of the improved valve mechanism of my invention, upon the suction stroke of piston 6 gaseous fluid from channel 7 forces ring 11 downward against the resistance of springs 16 engaging lugs 12 and enters the interior of the cylinder. The compression stroke of the piston 6 compresses such gaseous fluid and forces ring 11 upward to close ports 9. The amount of travel of ring 11 is limited by the stops 17 formed at the base of recesses 13 in cylinder 2. When the compression stroke of piston 6 compresses gaseous fluid, the gaseous fluid is forced through ports 18, raising ring member 20 and passing it to the cylinder head 3 and then through the discharge outlet 19 formed therein. The suction valve mechanism provided by my invention is accurate and efficient in operation; the lugs 12 are somewhat flexible permitting valve action to occur without mechanical noises even at high speed.

It will be understood the improved valve mechanism of my invention is not limited to its use as a suction valve. It will be understood similar mechanism may be used as a discharge valve. Such a structure is shown in Figure 3. The structure shown in Figure 3 is similar to that shown in Figure 1 except that my improved form of valve mechanism is provided for use as a discharge valve. The discharge valve mechanism shown in Figure 3 comprises a ring member 24 having lugs 25 extending radially therefrom. The lugs 25 engage guide pins 26 disposed in recesses in wall 27 of cylinder head 3. Springs 28 are also disposed in the recesses to exert forces against the lugs 25 thus yieldably urging ring member 24 against ports 18 to close the ports. Upon the compression stroke of the piston, compressed fluid forces ring member 24 to travel away from ports 18 permitting its discharge into the interior of cylinder head 3 and its passage through outlet 19. As the pressure of the gaseous fluid decreases springs 28 return ring member 24 to position closing ports 18.

My invention provides a simple and economical valve for use in compressors. Preferably such valve is used as a suction valve, but it will be understood it may also be used in place of discharge valves of customary construction. The valve mechanism so provided does not create an excessive amount of mechanical noise even at high speed and permits a reasonably high valve lift and low gas velocity. The valve lift provided by my invention is greater than the lift obtainable with strip valves in which the lift is obtained solely by flexure of the strip.

While I have described a preferred embodiment of my invention, it will be understood my invention is not limited thereto since it may be otherwise embodied within the scope of the following claims.

I claim:

1. In valve mechanism, the combination of port means disposed in a valve plate for the passage of fluid through the valve plate, a movable ring valve adapted to close the port means, a plurality of lugs integral with the ring and extending outwardly therefrom, springs engaging the lugs to hold the ring in position to close the port means, guide pins for said ring member, at least some of said pins fitting in orifices in said lugs, and a stop adapted to engage the lugs to limit the downward travel of the ring member.

2. In apparatus of the character described, the combination of a cylinder, a valve plate disposed adjacent the cylinder, port means in said valve plate for the passage of fluid into the cylinder, a movable annular valve member adapted to close said port means, a plurality of spaced elements integral with said member and extending radially therefrom, the wall of the cylinder having recesses therein to receive said elements, guide members for said valve, at least some of said elements engaging said guide members, yieldable means engaging said elements to secure the valve member in position to close the port means, and means for limiting the travel of the valve member, said means being adapted to engage the radially extending elements to limit the downward travel of the valve member.

3. In apparatus of the character described, the combination of a cylinder, a valve plate disposed adjacent the cylinder, ports in said valve plate for the passage of fluid into said cylinder, a movable ring member adapted to close said ports, a plurality of spaced lugs integral with the ring member and extending radially therefrom, the wall of the cylinder having recesses therein to receive the lugs, guide pins engaging at least some of the lugs, springs engaging the lugs to secure the ring member in position to close the ports, and means for limiting the downward travel of the ring member.

4. In apparatus of the character described, the combination of a cylinder, a valve plate disposed adjacent the cylinder, ports in said valve plate for the passage of fluid into the cylinder, a movable ring member adapted to close the ports, said ring member being disposed between the valve plate and the cylinder, a plurality of spaced lugs integral with said ring member and extending radially therefrom, the wall of the cylinder having recesses therein to receive said lugs, guide pins for said ring member disposed in said recesses, at least some of said lugs engaging said guide pins, a plurality of springs disposed in said cylinder wall engaging the lugs to secure the ring member in position to close the ports, and means in said cylinder wall adapted to engage the lugs to limit the travel of the ring member.

5. In apparatus of the character described, the combination of a cylinder, a cylinder head, a valve plate disposed between the cylinder and the cylinder head, port means in said valve plate for the passage of fluid into the cylinder, second port means in said valve plate for the passage of fluid from the cylinder into the cylinder head, a movable valve member adapted to close said first port means, a plurality of spaced elements integral with said member and extending radially therefrom, the wall of the cylinder having recesses therein to receive said elements, guide members engaging at least some of said elements, yieldable means engaging said elements to secure the valve member in position to close the first port means, means for limiting the travel of the valve member, a second valve member for closing said second port means, and yieldable means for securing said second valve member in position to close said second port means.

6. Apparatus of the character described according to claim 5 in which the second port means are closed by a ring member having a plurality of spaced lugs integral therewith and extending radially therefrom, and springs engaging the lugs of the ring member to secure the ring member in position to close the second port means.

LARS HANSON.

REFERENCES CITED

The following references are of record in the file of this patent:

UNITED STATES PATENTS

| Number | Name | Date |
|---|---|---|
| 1,297,296 | Jackson | Mar. 11, 1919 |
| 1,322,273 | Warnock | Nov. 18, 1919 |
| 1,376,484 | Tuttle | May 3, 1921 |
| 1,651,235 | Terill | Nov. 29, 1927 |
| 1,669,424 | Schneider | May 15, 1928 |
| 1,688,027 | Steedman | Oct. 16, 1928 |
| 1,688,185 | Hazard | Oct. 16, 1928 |
| 2,187,931 | Bush et al. | Jan. 23, 1940 |
| 2,372,938 | Doeg | Apr. 3, 1945 |

FOREIGN PATENTS

| Number | Country | Date |
|---|---|---|
| 178,250 | Germany | of 1906 |
| 493,059 | France | of 1919 |
| 859,131 | France | of 1940 |